Patented Dec. 22, 1942

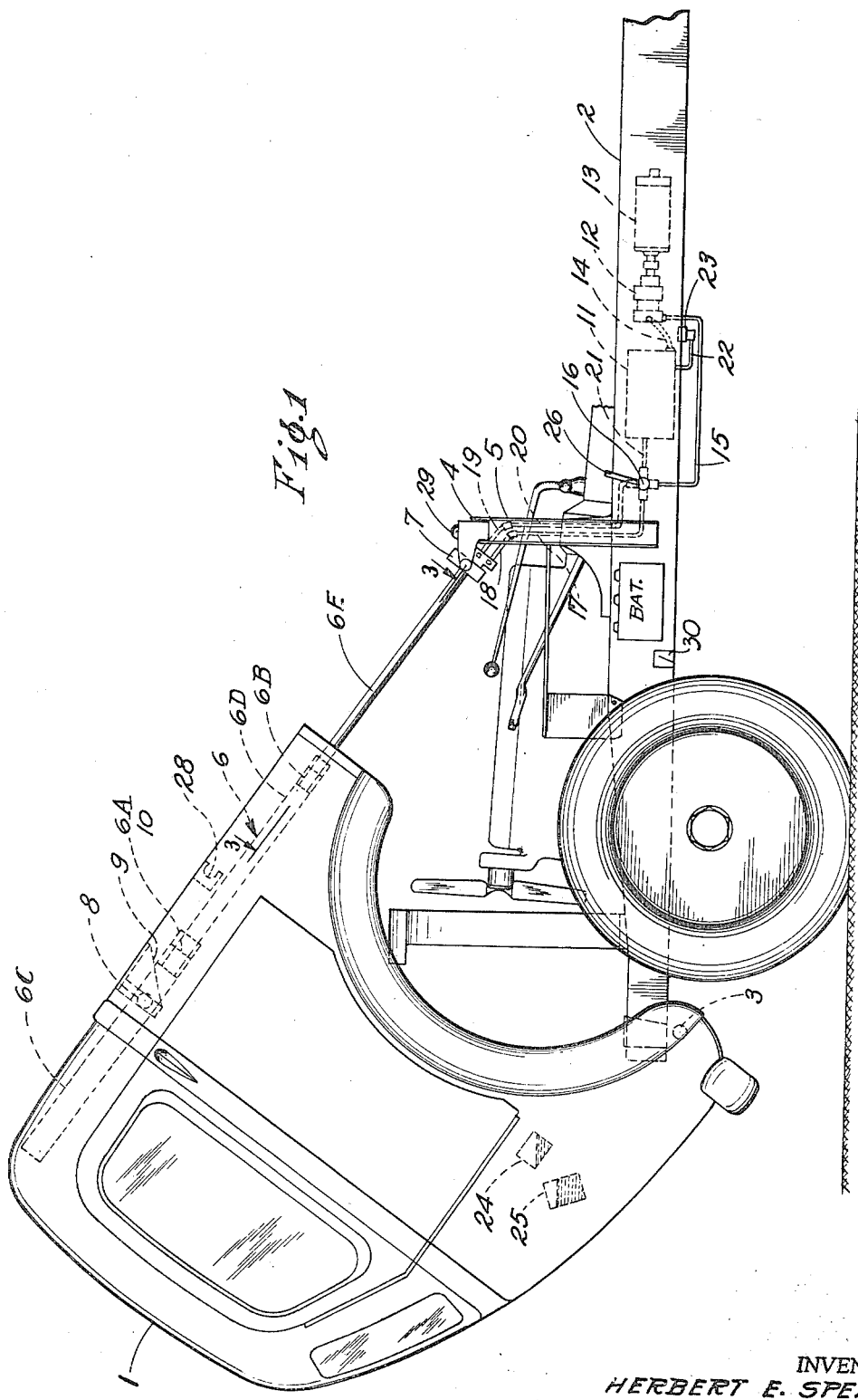

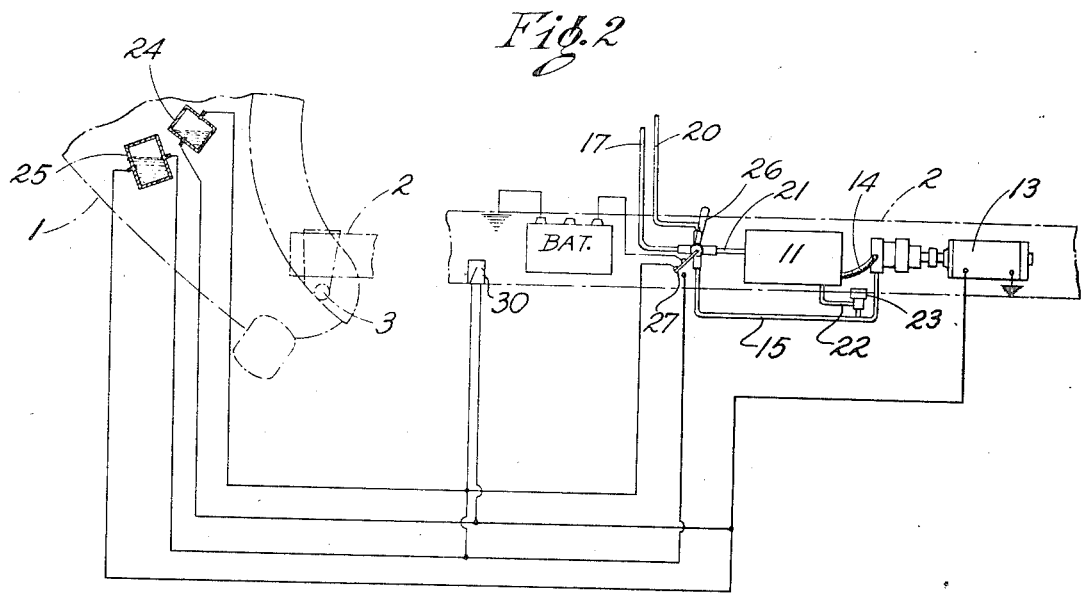
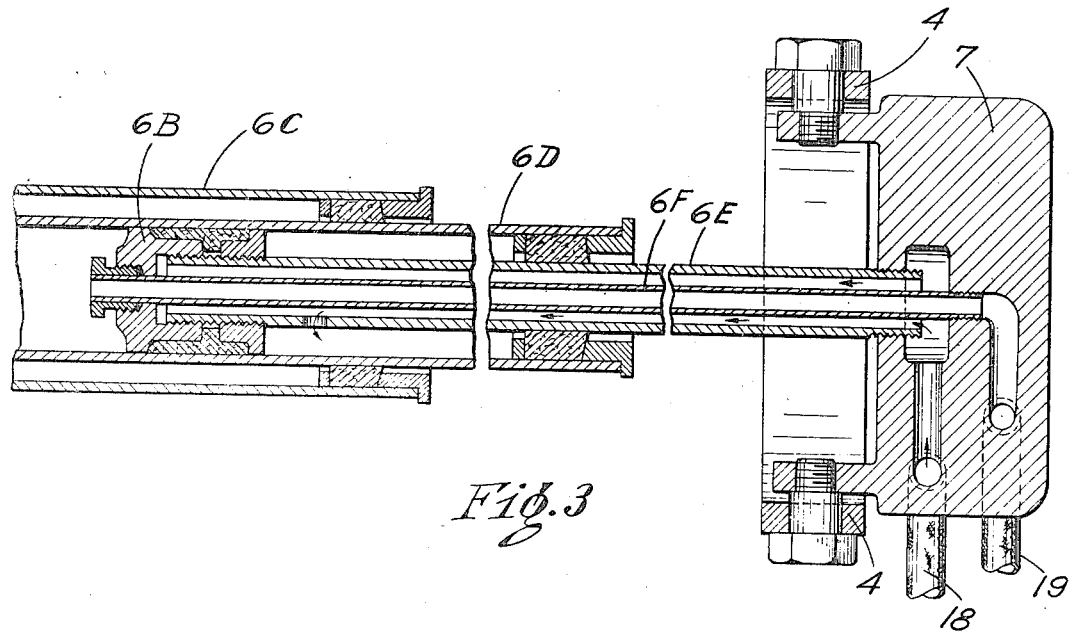

2,306,348

UNITED STATES PATENT OFFICE 2,306,348

HYDRAULIC LIFT FOR FORWARD-TILTING CABS

Herbert E. Spear, Detroit, Mich., assignor to Shell Development Company, San Francisco, Calif., a corporation of Delaware Application November 12, 1941, Serial No. 418,725

4 Claims. (Cl. 180—89)

This invention relates broadly to motor vehicles and more specifically to improvements in commercial vehicles of the tilting cab type.

In the transportation industry there has been a tendency to carry increasingly larger payloads, thus requiring the use of larger motor trucks. As a result of this demand motor trucks of unusually long wheel bases have been produced. However, such vehicles have been found difficult to operate and maneuver on our present-day highway bridges and docks.

With a view of reducing the over-all length of the trucks without decreasing the payload or carrying capacity space it has become fairly common practice in certain localities to mount the cab or driving compartment at the forward end of the chassis. One of the disadvantages of such an arrangement is that the accessibility to the engine is greatly reduced. Therefore, various means and methods have been devised for removing the cab from its position over the engine in order to overcome this difficulty. Prior art devices have failed to awaken much commercial interest because of the great amount of manual effort and length of time required to operate such devices.

It is an object of the present invention to provide mechanical means for tilting the cab of the so-called cab-over-engine vehicles.

Another object of this invention is to eliminate or reduce the manual effort and time required in tilting the cab.

Another object is to provide means whereby the cab may be tilted to any degree within a given maximum and remain at any desired attitude for an indefinite period of time.

A still further object of this invention is to provide means whereby the maximum degree of tilting is automatically limited.

Another object is to provide tilting means for a cab utilizing a source of power entirely independent of the engine of the vehicle.

Another object of this invention is to provide in connection with a cab and its tilting mechanism the maximum amount of accessibility to the power plant of the vehicle as well as the accessories and chassis parts located under the cab.

Other objects together with numerous advantages inherent in the invention will appear in the following description.

In the drawings:

Fig. 1 is a side elevation of a cab in a tilted position;

Fig. 2 is a diagrammatic view of the electrical switches and connections therefor; and Fig. 3 is a longitudinal section of the hydraulic ram and coupling member therefor, the section being taken on the line 3—3 of Fig. 1.

With reference to the drawings, a motor vehicle having a cab 1 and side frame members 2 is shown in part. The lower edge of the forward portions of the cab 1 are provided with pintles mounted in bearings fixed upon the chassis frame 2, the cab being pivotal about the axes of pintles 3. The rearward portion of the cab rests upon a supporting bracket 4 fixed upon a stanchion or frame cross member 5.

A telescopic hydraulic ram 6 is pivotally attached adjacent its lower end to a hollow trunnion member 7, pivotally mounted upon the supporting bracket 4. The upper end of said ram is attached to a bracket 9 on the rear wall 10 of the cab 1 by means of a universal trunnion 8. A hydraulic reservoir 11 and a pump 12 driven by an electric motor 13 are mounted on the chassis of the vehicle. The reservoir is provided with a pipe 14, which leads to the pump 12. A pipe 15 leads from the pump to a four-way valve 16.

The telescopic ram 6 is more fully understood by reference to Figure 3 of the drawings. The ram consists essentially of two telescopically slidable cylinders 6C, 6D and a tube 6E. The tube 6E has an inner tube 6F which does not move with relation to tube 6E, but serves to conduct the fluid to the upper end of piston 6B when the cab is being raised as is more fully explained later herein. 6E and 6F terminate at their lower end in the trunnion 7 and at their upper ends in the piston 6B. Although the upper end of cylinders 6C and 6D are not shown in Figure 3 it will be appreciated by those skilled in the art that the cylinder 6C is closed at its upper end and that cylinder 6D has an opening at its upper end. The trunnion member 7 serves as the base of the ram and is provided with two separate passages therein for conducting liquid to and from the ram. One passage connects to the tube 6E and the other to tube 6F leading to the top of piston 6B.

A pipe 17 with a section of flexible pressure hose 18 is connected to the trunnion member 7 where fluid communication is provided with the ram 6. The ram is also provided with a section of flexible pressure hose 19 and a pipe 20 which is connected to the four-way valve 16. A pipe 22 having a pressure relief valve 23 therein communicates with the pipe 15 at a point intermediate the pump and reservoir for the purpose of by-passing fluid to the reservoir when the pressure rises above a predetermined standard. The cab is tilted forward under the influence of pressure fluid exerted upon the pistons within the ram.

The forward tilting movement of the cab is arrested at a predetermined position by means of a limiting switch 24 which opens the electrical circuit, thereby cutting off the motor 13 and pump 12. Any of the well known types of limiting switches, such as the mercury filled type or pendulum types, or the like, may be used for this purpose. The ram 6 is operated by fluid under pressure delivered through the pipe 20 which enters cylinders 6C and 6D (Fig. 1), forcing pistons 6A and 6B, which are connected to cylinder 6D and tube 6E respectively, to their extended position, thereby lifting the rear end of the cab 1 upward and forward. The fluid passes from cylinder 6D to cylinder 6C through an opening in the top of cylinder 6D. The four-way valve 16 is provided with a handle 26, the adjustment of which in a downward or neutral position performs two simultaneous functions, namely that of cutting off the flow of fluid between the ram 6 and the other parts of the fluid system and moving a double pole switch 27 to its open circuit position, which cuts off the current to the motor. A further downward movement of the handle 26 places pipes 20 and 17 in fluid communication with pipes 21 and 15 respectively and, at the same time, closes the double pole switch 27 which, in turn, closes the electrical circuit to the limiting switch 25 and the motor 13. This causes the pump to force the fluid to flow through the pipe 15 to the four-way valve and thence through pipes 17 and 18 to the hydraulic ram. The fluid enters said ram through the tube 6E whence it flows through a duct into the chamber defined by the cylinder 6D and tube 6E, where it forces cylinder 6D downward, thus tilting the cab backward and downward about the axes of the pintles 3 until it reaches a point where the center of gravity of the cab 1 has passed the vertical center of the pintles. At such predetermined position, the limiting switch 25 opens the electrical circuit stopping the motor and pump. The weight of the cab causes the further downward movement thereof until a ball socket 28 in the bottom of the cab is seated upon a ball 29 which carries the weight of the cab in its lowered position. As the cab tilts backward and downward, the fluid is forced from cylinders 6C and 6D through pipes 19 and 20 to the four-way valve 16 and thence through pipe 21 to reservoir 11.

As the cab tilts forward and upward, the fluid in the space between the cylinders 6D and 6E is exhausted by piston 6B and flows through pipes 17 and 18 through the four-way valve and thence through pipe 21 to reservoir 11.

Under certain seldom encountered conditions, such as for example when a truck embodying the above described cab tilting device is parked on a steep incline which would interfere with the operation of limiting switches 24 and 25, it may be desirable to tilt the cab manually, i. e. without the action of limiting switches 24 and 25. For this purpose, switch 30 is provided, the closing of which short-circuits limiting switches 24 and 25. The extent to which the cab tilts may then be controlled entirely by four-way valve 16 and the co-operating double pole switch 27. Pressure relief valve 23 serves as a safety valve in this instance to relieve excessive pressure developed in pipe 15, in the event that the cab should be carelessly tilted to the maximum extension point of ram 6.

Although the foregoing description is necessarily of a detailed character, in order that the invention may be completely set forth, it is to be understood that the specific terminology is not intended to be restrictive or confining, and that various rearrangements of parts and modifications of detail may be resorted to without departing from the scope or spirit of the invention as herein claimed.

I claim as my invention:

1. In a motor vehicle embodying the chassis frame, an engine and a cab pivotally mounted upon the frame above the engine, mechanism for tilting said cab comprising a stanchion mounted upon said frame rearwardly of said engine, a trunnion in said stanchion superjacent the top of said engine, a hydraulic ram connected to said trunnion and with the rearward portion of said cab, a pump for actuating said ram, and electrically operated mechanism for actuating said pump.

2. In a motor vehicle embodying a chassis frame, an engine and a cab pivotally mounted upon the frame above the engine, mechanism for tilting said cab comprising an arched stanchion spanning said chassis frame and anchored thereon, the central portion of said stanchion being disposed above the top of said engine, a piston, a cylinder therefor pivotally mounted upon the rearward portion of the cab, the free end of said cylinder being disposed above the central portion of said stanchion when the piston is in its retracted position, a pivotal connection between said piston and the central portion of said stanchion, a pump, mechanism for operating said pump and fluid connections between said pump and said cylinder for operating said piston in either direction.

3. In a motor vehicle embodying a chassis frame, an engine and a cab pivotally mounted upon the frame above the engine, mechanism for tilting said cab comprising a cylinder pivotally mounted upon said cab, a piston therein, a piston rod therefor having fluid passage therethrough, a coupling member secured to said rod and pivotally mounted upon a stanchion, and a pump, said coupling member having a passageway therein in fluid communication with the passage in said rod, and flexible conduits uniting said pump with said coupling.

4. In a motor vehicle embodying a chassis frame, an engine and a cab pivotally mounted upon the frame above the engine mechanism for tilting said cab comprising a cylinder, a piston therein, pivotal mountings connecting said cylinder and piston with said cab and said frame, an electric motor, a pump driven thereby, fluid conduits between said pump and said cylinder, a pair of electric switches in said cab coupled with said electric motor and means in said switches responsive to the angular attitude of said cab to the horizontal plane for automatically making and breaking the electric circuit of said electric motor.

HERBERT E. SPEAR.